United States Patent [19]

Ichikawa

[11] Patent Number: 4,613,740

[45] Date of Patent: Sep. 23, 1986

[54] GUIDE HOLDERS OF ELECTRODISCHARGE MACHINING APPARATUS HAVING WIRE ELECTRODE

[75] Inventor: Yoshiyasu Ichikawa, Tokyo, Japan

[73] Assignee: Ogura Jewel Industry Co., Ltd., Tokyo, Japan

[21] Appl. No.: 548,888

[22] PCT Filed: Feb. 3, 1983

[86] PCT No.: PCT/JP83/00030

§ 371 Date: Oct. 5, 1983

§ 102(e) Date: Oct. 5, 1983

[87] PCT Pub. No.: WO83/02742

PCT Pub. Date: Aug. 18, 1983

[30] Foreign Application Priority Data

Jan. 12, 1983 [JP] Japan ................................. 58-1703
Feb. 3, 1983 [JP] Japan ................................. 57-14197

[51] Int. Cl.⁴ ............................................. B23P 1/08
[52] U.S. Cl. ............................ 219/69 W; 76/107 A; 204/206
[58] Field of Search ............... 219/69 W, 69 E, 69 V; 76/107 A; 72/467; 204/129.7, 206, 286

[56] References Cited

U.S. PATENT DOCUMENTS

| 978,302 | 12/1910 | Joyce | 72/467 |
|---|---|---|---|
| 2,699,692 | 1/1955 | Kronouer et al. | 76/107 A |
| 4,250,371 | 2/1981 | Haug et al. | 219/69 W |
| 4,260,397 | 4/1981 | Bovenkerk | 72/467 |
| 4,378,690 | 4/1983 | Stiebritz et al. | 76/107 A |
| 4,392,397 | 7/1983 | Engelfriet et al. | 76/107 A |

FOREIGN PATENT DOCUMENTS

| 682336 | 10/1939 | Fed. Rep. of Germany | 72/467 |
|---|---|---|---|
| 125943 | 9/1980 | Japan | 219/69 W |
| 56-76337 | 6/1981 | Japan | 219/69 W |
| 56-89436 | 7/1981 | Japan | 219/69 W |
| 102432 | 8/1981 | Japan | 219/69 W |
| 8201673 | 5/1982 | PCT Int'l. Appl | 76/107 A |
| 846211 | 7/1981 | U.S.S.R. | 219/69 E |
| 937124 | 6/1982 | U.S.S.R. | 219/69 W |

OTHER PUBLICATIONS

Industrial Diamond Review, W. Stiebritz et al., vol. 42, No. 492, May, 1982, p. 322.

Primary Examiner—C. L. Albritton
Assistant Examiner—Geoffrey S. Evans
Attorney, Agent, or Firm—Armstrong, Nikaido, Marmelstein & Kubovcik

[57] ABSTRACT

An improved guide holder is disclosed for an electrodischarge machining apparatus having a wire electrode, characterized in that the guide holder has a guide member with a cap, preferably non-conductive, is fixed to one side of a diamond body having a hole for passing through the wire electrode, and a pedestal is fixed to the other side of the diamond body, and that the cap and the pedestal each have a truncated conical hole which is in communication with the hole of the diamond body.

7 Claims, 10 Drawing Figures

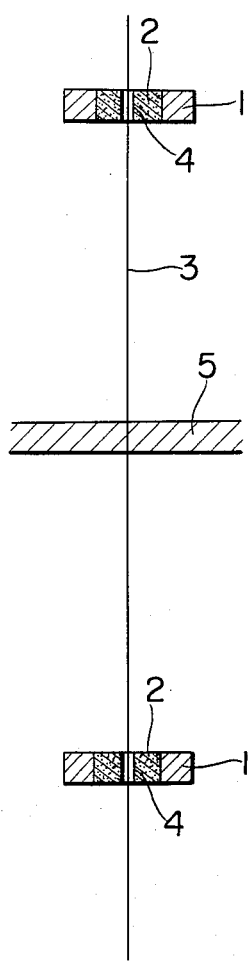
FIG. 1
PRIOR ART
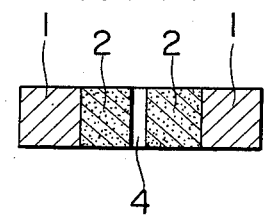
FIG. 2
PRIOR ART
FIG. 3
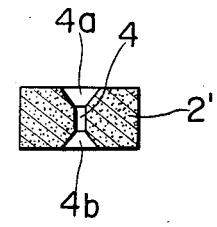
FIG. 4
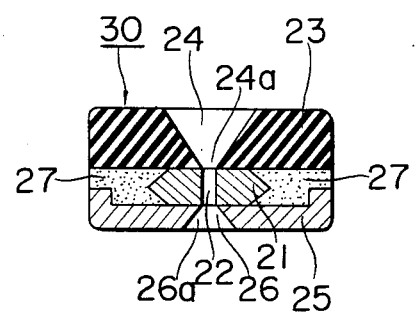

GUIDE HOLDERS OF ELECTRODISCHARGE MACHINING APPARATUS HAVING WIRE ELECTRODE

TECHNICAL FIELD

The present invention relates to guide holders of an electrodischarge machining (EDM) apparatus having a wire electrode. As illustrated in FIG. 1, an EDM apparatus is so designed that workpiece (5) is cut or electroeroded by means of an electric potential-applied wire electrode (3), which is moved through the guide members (2)(2) disposed in the guide holders, e.g. the metallic holders (1)(1).

In particular, this invention relates to a guide holder of an EDM apparatus, wherein a diamond body, which is considered to be the hardest solid material, is employed in the guide member for the purpose of minimizing the wear and the deformation of the wall of the wire electrode-guiding hole of the guide member due to the friction between the guide member and the wire electrode passing through the guide member. Furthermore, the guide holder according to the invention is so designed that it is easy to conduct an operation of inserting the wire electrode into the hole of the guide member. In addition, the guide holder is sufficiently resistant to any electroerosion.

BACKGROUND OF THE INVENTION

As illustrated in FIG. 2, a known guide holder device comprises a metallic holder (1), into which a diamond guide member (2) is inserted. The guide member (2) has a cylindrical hole (4), through which a wire electrode (3) is passed. As the wire electrode (3) is very fine and the hole (4) has a very small diameter of at most 0.2 mm, it is a difficult and time-consuming operation to insert the wire electrode into the hole (4). Furthermore, the known guide holder device has also such a shortcoming that an electric corrosion occurs at the metallic holder (1).

If a sapphire guide member (2'), as shown in FIG. 3, is employed instead of the diamond guide member (4), then it is practically possible to form the both ends of the hole (4) into the shape of a truncated cone (4a) (4b), because sapphire has a hardness lower than that of diamond. However, the wear rate of the wall of the hole (4) of the sapphire guide member (2') is considerably higher than that of the diamond guide member.

It is an object of the invention to provide an improved guide holder of an EDM apparatus, said guide holder comprising a diamond guide member and not having any shortcomings as mentioned above.

SUMMARY OF THE INVENTION

This invention relates to a guide holder of an EDM apparatus having a wire electrode, wherein a guide member is disposed in or attached to the guide holder, and the guide member is so designed that a cap is fixed to one side of a diamond body which has a hole for passing through the wire electrode, that a pedestal is fixed to the other side of the diamond body, and that the cap and the pedestal each have a truncated conical hole which is in communication with the hole of the diamond body.

According to an embodiment of the invention, the diamond body, the cap and the pedestal are tightly fixed to one another with the aid of fixing means. The fixing may be accomplished, for instance, by employing an adhesive or by conducting a sintering operation.

The outer surface of the guide holder may be coated with an electrically non-conductive film i.e. an electrically insulative film as shown below.

It is advantageous that the front edge of the cap should be disposed at a position projected over the front edge of the guide member-supporting area of the guide member as explained in detail in the below.

It is preferred that the cap should be made from a non-conductive material such as sapphire, ruby, a ceramic material or the like. On the other hand, the pedestal is preferably composed of a metallic material.

BRIEF EXPLANATION OF ACCOMPANYING DRAWINGS

FIG. 1 is a schematic longitudinal sectional view of a known EDM apparatus, wherein the relationship between the guide holders and the wire electrode is illustrated.

FIG. 2 is a longitudinal sectional view of a known guide holder having a diamond guide member.

FIG. 3 is a longitudinal sectional view of a known sapphire guide member.

FIG. 4 is a longitudinal sectional view of an example of guide members according to the invention.

PREFERRED EMBODIMENTS OF THE INVENTION

Figure 5:
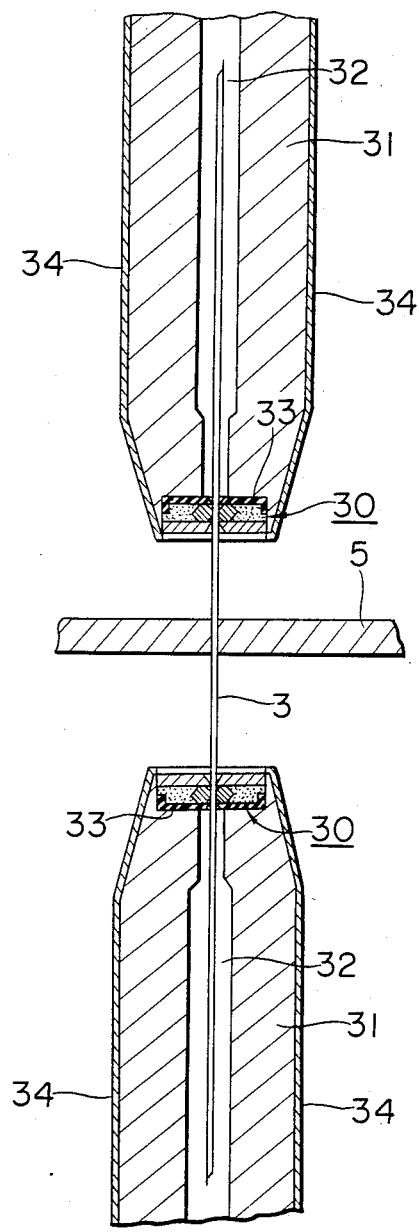
FIG. 5 is a longitudinal sectional view of an EDM apparatus, wherein the relationship between the wire electrode and the two guide holders according to the invention is illustrated.

Now, a detailed explanation is made about several examples of the guide holders according to the invention.

In the guide member shown in FIG. 4, the diamond body (21) has at its center area a cylindrical hole (22) having a diameter of about 0.1 to 0.5 mm, preferably 0.15 to 0.3 mm, more preferably 0.17 to 0.25 mm, e.g. about 0.21 mm. The hole (22) serves as a guide for a wire electrode. A cap (23) is disposed on one side of the diamond body (21). The cap (23) has a truncated conical hole (24), the narrowest portion (24a) of which has the same diameter as that of the hole (22) of the diamond body (21). The cap (23) may be made from an easily workable, non-conductive material such as sapphire, ruby, a ceramic material or the like. The narrowest portion (24a) of the truncated conical hole (24) of the cap (23) should be in communication with the hole (22) of the diamond body (21).

On the other side of the diamond body (21), a pedestal (25) is disposed. The pedestal (25) is preferably made from a metallic material, for instance, a SUS 304 material. The pedestal (25) has a truncated conical hole (26), the narrowest portion (26a) of which has the same diameter (e.g. 0.21 mm) as that of the hole (22) of the diamond body (21). The narrowest portion (26a) of the truncated conical hole (26) of the pedestal (25) should be kept at a position where the narrowest portion (26a) is in communication with the hole (22) of the diamond body (21).

The cap (23), the diamond body (21) and the pedestal (25) are fixed or bonded to one another with the aid of a sintered material (27) which is present between the inner surface of the cap (23) and that of the pedestal (25), whereby the guide member (30) is formed or assembled.

As shown in FIG. 5, the guide member (30) is connected or bonded with an adhesive to a cavity (33) provided at one end of the guide holder (31), which has a guide hole (32) for the wire electrode. It is also possible to tightly fix the guide member (30) to the cavity (33) of the guide holder (31) with the aid of calking means. The outer surface of the guide holder (31) is preferably coated with a non-conductive resin film 34.

The embodiment of the invention just mentioned above has the following advantages. The guide member (30) has the guide hole for the wire electrode (3). The hole has the two truncated conical portion (24) (26), each of which has the largest diameter portions at each outer surface of the guide member (30), so that it is very easy for an operator to conduct an operation of inserting or passing the wire electrode (3) through the hole. Furthermore, the cap (23) and the pedestal (25) are composed of easily workable materials, so that the guide member (30) can be easily produced or assembled.

The wire electrode (3) is moved, for example, at a high velocity of about 80 mm/sec. Therefore, when the EDM apparatus is operated for cutting the workpiece (5), the wall of the hole (22) is subjected to a severe rubbing action of the wire electrode (3). However, since the wall of the hole (22) is composed of the very hard diamond body, the wear rate of the wall is very low. Thus, the guide member (30) according to the invention has a satisfactory durability. Furthermore, the outer surface of the guide holder is preferably coated with a non-conductive film in order to avoid any electoerosion of the holder.

Figure 10:
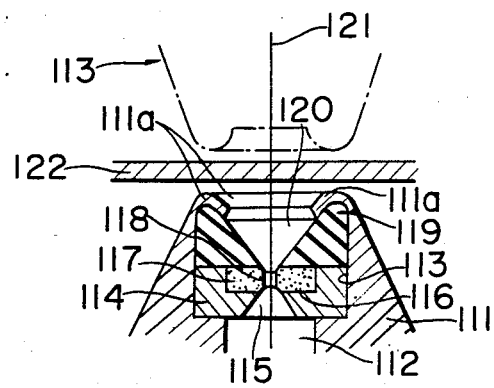

In the above-mentioned embodiment of the invention, the bonding means employing the sintered material may be replaced by other bonding or fixing means such as an adhesive or a mechanical engagement. For instance, in the end portion of the guide holder (111) shown in FIG. 10, a cylindrical cavity (113) is formed, so that the cavity (113) communicates with the hole (112) for passing through the wire electrode (142). A metallic pedestal (114), which has a truncated conical hole (115), is inserted into the cavity (113) of the guide holder (111). Then, a diamond body (117), having a hole (118) for passing through the wire electrode, is disposed on the metallic pedestal (114) placed in the cavity (116). Thereafter, a non-conductive cap (119), having a truncated conical hole (120), is disposed on the diamond body (117). After that, the front edge of the wall of the cavity (115) is bended towards the non-conductive cap (119), so that the nonconductive cap (119), the diamond body (117) and the metallic body (114) are tightly fixed and fastened into the cavity (115) with the bent front edge (111a) of the cavity wall.

Figure 6:
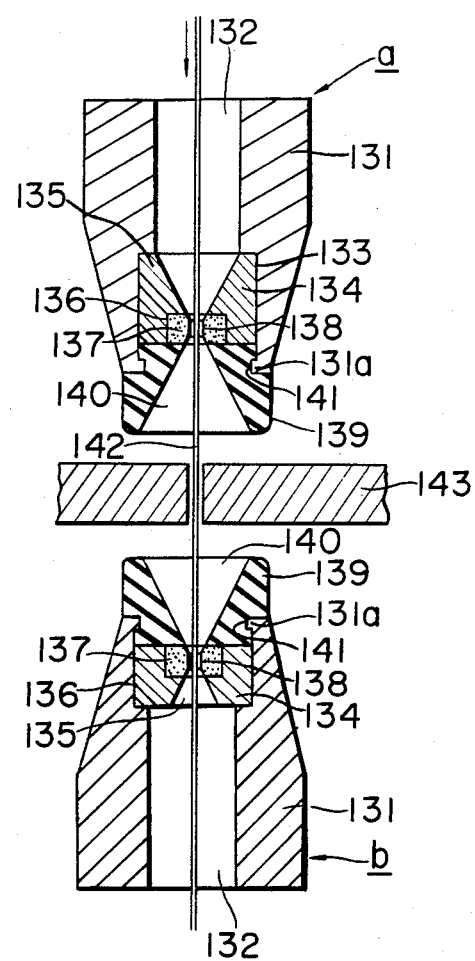
FIG. 6 is a longitudinal sectional view of an apparatus employing the guide holders according to another embodiment of the invention.
Figure 7:
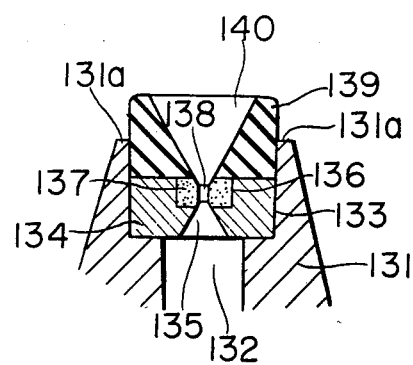
FIGS. 7 to 10 are longitudinal sectional views of various examples of the guide holders according to the invention.

Now, an explanation is given about other embodiments of the invention shown in FIGS. 6 to 9. FIG. 7 shows a metallic guide holder (131), wherein a guide member-supporting area (133), having a shape of a cylindrical cavity, is formed in such a way that the diameter of the cavity is substantially the same as that of non-conductive cap (139). The important feature of this embodiment is that the front side of the cap (139) projects over the front edge (131a) of the cavity wall of the metallic guide holder (131).

Figure 8:
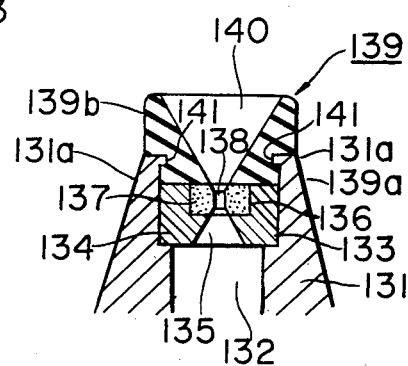

FIG. 8 shows a metallic guide holder (131), wherein a cavity (133) is formed. On the other hand, a non-conductive cap (139) is so designed that the lower portion (139a) has the same diameter as that of the cavity (133) of the guide holder (131), and that a recess (131a) is formed on the outer surface of the cap (139), whereas the upper portion (139b) of the cylindrical surface of the cap (139) has a diameter larger than that of the lower portion (139a). Due to the unique shape of the cap (139) mentioned above, the cap can be fixed to the guide holder (131) by inwardly bending and inserting the front edge (131a) of the guide holder (131) into the recess (141) of the cap (139).

Figure 9:
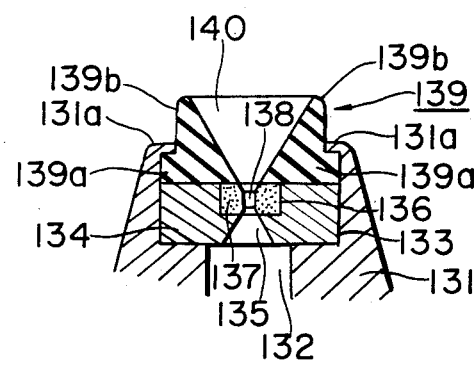

FIG. 9 illustrates another embodiment, wherein the upper portion (139b) of the non-conductive cap (139) has a diameter smaller than that of the lower portion (139a), so that the upper portion (139b) projects over the front edge (131a) of the guide holder (131), and is fixed to the guide member (131) with the aid of its front edge (131a) bent inwardly.

FIG. 6 shows an EDM apparatus, wherein a pair of the guide holders (a)(b), having the shape and the structure shown in any of FIGS. 6 to 9, is employed, and wherein a wire electrode (142) can be moved through the guide holders (a)(b) to cut a workpiece (143). In this apparatus, the both sides of the workpiece (143) are faced to the non-conductive caps (139)(139), respectively, so that no electric discharge phenomena will occur between the workpiece (143) and the guide holders (a)(b), even if the guide holders are positioned considerably near the workpiece (143). Therefore, any electrification phenomena will not occur between the two caps (139)(139), so that the holes (138)(138), guiding the wire electrode, will not be clogged with shavings, dusts and the like. Therefore, in this EDM apparatus, it is possible to cut a workpiece smoothly with a high working accuracy without any trouble. Furthermore, it is unnecessary for this apparatus to conduct an inspection operation frequently.

APPLICABILITY OF THE INVENTION TO INDUSTRIAL FIELDS

As explained in the preceding paragraphs, the guide holders according to the invention employ a diamond body, having the highest hardness, in the guide member to minimize the wear and the deformation of the wall of the guide holes for the wire electrode. So, the guide members have a good durability. Furthermore, the guide members can be easily produced or assembled, and it is also easy to conduct an operation of passing a wire electrode through the holes of the guide members. In addition, any electroerosion of the guide members does not occur. So, it can be said that the guide holders according to the invention are very suitable for an EDM apparatus. Thus, the invention contributes to a great improvement of the performance and durability of EDM apparatuses.

I claim:

1. A guide holder for an electrodischarge machining apparatus having a wire electrode and a guide holder means comprising
   (a) a cap of a non-conductive material having a hole through which said electrode passes,
   (b) a durable wear resistant guide member body with a hole through which said electrode passes,
   (c) a pedestal member which together with said cap encloses and retains said guide member body, (d) said cap and said pedestal member each having a truncated conical hole axially aligned with the hole through said guide member body and with said electrode, the truncated hole portions of said cap and pedestal being oppositedly flared outwardly with respect to each other, and (e) said cap, guide member body, and said pedestal beiing secured together by a fixing means.

2. A guide holder in accordance with claim 1, wherein the outer surface of said guide holder is coated with an electrically non-conductive film.

3. A guide holder as claimed in claim 1, wherein said guide membe body is diamond and said non-conductive cap is made of a least one material selected from the group consisting of sapphire, ruby and a ceramic material.

4. A guide holder as claimed in claim 1, wherein said fixing means comprises a sintered material.

5. A guide holder as claimed in claim 1, wherein said fixing means comprises an adhesive material.

6. A guide holder as claimed in claim 1, wherein said pedestal is metal, and said fixing means comprises a portion of said pedestal interlocked with a portion of said cap to secure said cap pedestal and guide member body together.

7. A guide holder as claimed in claim 1, wherein said non-conductive cap shields said pedestal from electrical discharge phenomena between said pedestal and the electrode working upon a workpiece being acted upon by said electrode and between said pedestal and said electrode.

* * * * *

UNITED STATES PATENT AND TRADEMARK OFFICE
CERTIFICATE OF CORRECTION

PATENT NO. : 4,613,740

DATED : September 23, 1986

INVENTOR(S) : YOSHIYASU ICHIKAWA

It is certified that error appears in the above-identified patent and that said Letters Patent is hereby corrected as shown below:

On the cover page, Item [30], change "Feb. 3, 1983" to --- Feb. 5, 1982 ---.

Signed and Sealed this

Eighteenth Day of August, 1987

Attest:

DONALD J. QUIGG

Attesting Officer

Commissioner of Patents and Trademarks